May 30, 1950           C. O. WINGREN           2,509,660
INVOLUTE GEAR
Filed June 28, 1946           2 Sheets-Sheet 1
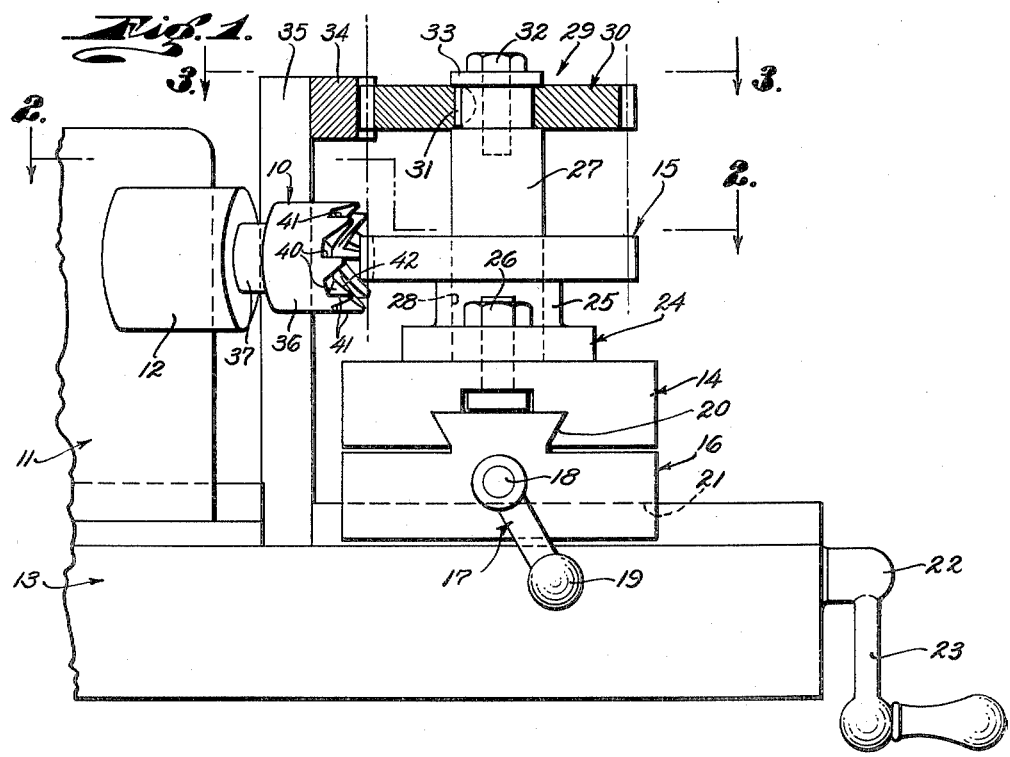
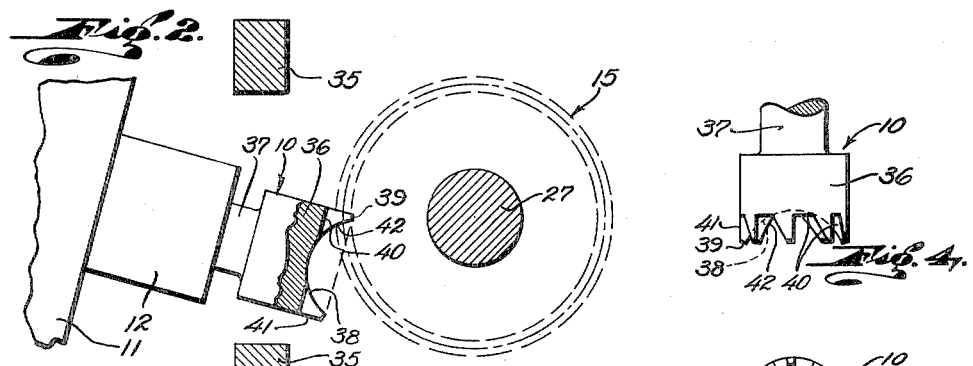
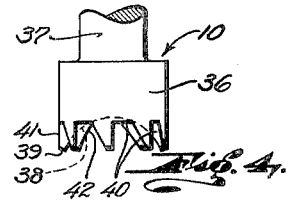
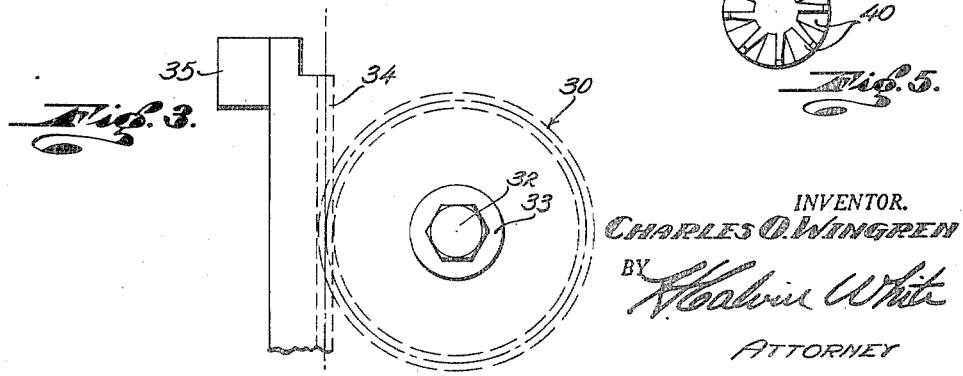
INVENTOR.
CHARLES O. WINGREN
BY Calvin White
ATTORNEY May 30, 1950   C. O. WINGREN   2,509,660
INVOLUTE GEAR Filed June 28, 1946   2 Sheets-Sheet 2

CHARLES O. WINGREN
INVENTOR.

BY Hoolun White
ATTORNEY

Patented May 30, 1950

2,509,660

UNITED STATES PATENT OFFICE 2,509,660

INVOLUTE GEAR

Charles O. Wingren, Pasadena, Calif.

Application June 28, 1946, Serial No. 680,022

6 Claims. (Cl. 74—466)

This invention relates to improvements in tooth formation for involute gears and the method of making the same. The improved gear provided by my invention has for its general object a tooth formation that allows a pair of mating gears to take positions of relative axis angularities in all directions while maintaining a circular line contact between their engaging surfaces.

This object is accomplished by forming on one side of each tooth of the mating gears, a spherical convex involute surface that is engageable with a cylindrical concave involute opposing surface on the opposite side of each meshing tooth. The engagement of the spherical tooth surface with the cylindrical opposing tooth surface allows the gears to maintain full circular line contact between the surfaces while assuming relative axis angularities.

A feature of the invention is the development of a simplified method of shaping opposing involute tooth surfaces, that may be formed simultaneously in one operation for increased speed in production while maintaining close accuracy in machining. To carry out the method, I have designed an improved form of cutter for simultaneously cutting opposing surfaces on involute teeth, shaped to form one of said surfaces with a curvature of spherical convex involute, giving the teeth particular characteristics not found in involute gears now in general use.

The improved gear provided by the invention is adapted for various uses where inherent strength and fast speed of operation are required, as in high speed transmissions of the type now employed in airplanes, where power is transmitted from the engine through a gear reduction to the propeller. Mating gears having the spherical convex involute tooth surface engaging a mating cylindrical concave involute tooth surface, will remain in circular line contact, even though their axis relation should deviate from set alignment, due to flexure of the gear case, shaft or flexure in the gear itself, when subjected to heavy loads and severe strains. The spherical convex curvature of the tooth produces a tooth of maximum strength and assures quiet operation of the gear.

The above mentioned features and objects as well as additional embodiments of the invention will be more readily understood from the following detailed description of the gear and methods for its formation, wherein reference is made to the accompanying drawings, in which:

Fig. 1 is a side elevational view of the apparatus provided by the invention for carrying out the method;

Fig. 2 is a cross-sectional view taken on line 2—2 of Fig. 1;

Fig. 3 is a plan elevational view taken on line 3—3 of Fig. 1;

Fig. 4 is a side elevation of the form cutter provided by the invention;

Fig. 5 is an end elevation of the cutter;

Figure 6:
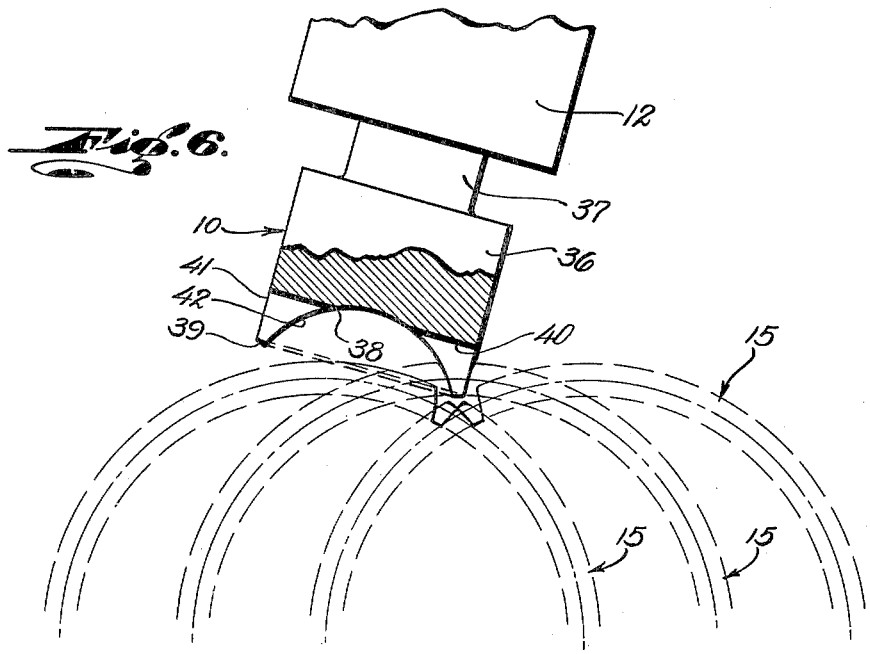
Fig. 6 is a fragmentary enlargement of Fig. 2 illustrating the gear generated about the form cutter.
Figures 7, 8:
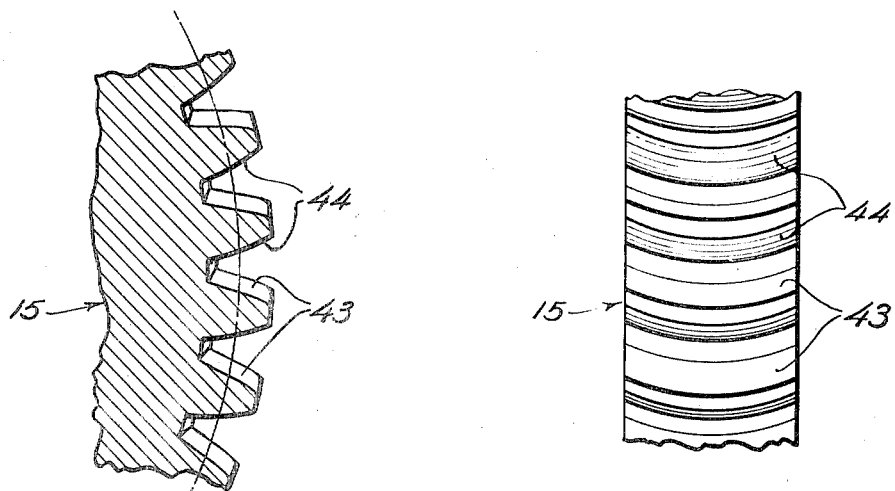
Fig. 7 is an enlarged fragmentary sectional view of a gear illustrating the teeth formation.
Fig. 8 is a side view of Fig. 7.

In the drawings I have illustrated a simplified form of apparatus including generally a cutter 10 mounted for rotation in a head or bearing post 11 to be driven by a suitable power means, not shown, through a chuck or collet 12. The head 11 is preferably mounted for rotation about a vertical axis on a bed 13 to facilitate angular adjustment of the cutter 12, and adjustable axially for setting the depth of the cut. A crosshead 14 for supporting the gear blank 15 is mounted for reciprocation transversely of the cutter on a carriage 16. Means 17 for reciprocating the crosshead 14 may be in the form of a typical hand operated feed screw 18 rotatable by crank 19. The crosshead 14 is guided for reciprocation transversely on the carriage 16 by dovetailed guide way 20. The carriage 16 may be similarly guided for reciprocation axially of the cutter by dovetailed guide way 21 and may be reciprocated by feed screw 22 rotatable by crank 23.

Means 24 for mounting the gear blank 15 for rotation about a vertical axis on the crosshead 14, includes a bearing collar 25 secured to the top of the crosshead through bolt connection 26. The gear blank 15 is carried on a mandrel 27 rotatable in bearing opening 28 of the collar 25 and is positioned vertically to have its central diametric axis concentric with the axis of the cutter 10.

The mandrel 27 is provided with means 29 for generating the gear blank along a tangent line to its pitch circle, and may include in its simplified form a spur gear 30 keyed to the upper end of the mandrel at 31 and retained by clamp screw 32 through washer 33. The spur gear 30 meshes with a stationary rack 34 carried at the upper end of spaced posts 35 extending upwardly from the bed 13 and in a plane parallel to the axis of the reciprocation of the crosshead 14. The spur gear 30 is provided with teeth of the same pitch and of the same circular pitch diameter as will be developed in involute formation on the gear blank 15. Means 29 in the form of the spur gear and meshing rack provides a simple means for generating a radial involute curvature on the gear blank 15 as the gear blank is bodily reciprocated by the crosshead 14, as illustrated in Fig. 6.

The cutter 10 includes a cylindrical body 36 provided with a shank 37 received by a rotating chuck or collet 12. The cylindrical body 36 is provided with a spherical concentric socket 38 in its outer end of substantially the same radius or curvature as the body. The converging surfaces of the body and socket are truncated in a conical plane 39 and are provided with serrations formed by notches 40 extending radially through the truncated portion to form straight axial cutting edges 41 and curved radial axial cutting edges 42. The cylindrical surface of the cutter 10 provided with the axial cutting edges 41, produces a cylindrical concave involute tooth surface 43, while the spherical socket of the cutter provided with its curved cutting edges 42, produces a spherical convex involute opposing surface 44 on the blank 15.

In operation, the gear blank rotatably carried by the crosshead 14, is positioned to have its central diametric axis in the same plane as the axis of rotation of cutter 10. The spur gear 30 carried in fixed relation with the gear blank 15 by rotatable mandrel 27, is provided with teeth of the same pitch and on the same pitch diameter to be developed on the blank. The feed screw 22 for the carriage 16 may be adjusted to bring the spur gear 30 into proper mesh with the stationary rack 34, at the same time bringing the pitch circle of the gear blank in line with the pitch line of the form cutter 10 by adjusting the bearing post 11 axially, when the form cutter is set at its desired angular relation to the axis of reciprocation of the crosshead 14, to produce a given pressure angle on opposing teeth. At this time the mean axis of the truncated portion of the cutter will intersect the center of the pitch circle of the blank 15. It will be seen how reciprocation of the crosshead 14, by rotation of the feed screw 18, and engagement of the spur gear with the rack 34 effectively generates the gear blank 15 along a tangent line of its pitch circle.

Fig. 6 illustrates the angular relation of the cutter relative to the axis of reciprocation of the gear blank 15 to produce an arcuate tooth curvature axially of the blank and develop an involute tooth curvature radially of the blank. The cylindrical surface of the cutter 10 with its axial cutting edges 41, produces a cylindrical concave involute tooth surface 43, while the spherical socket of the cutter provided with its curved cutting edges 42, produces a spherical convex involute opposing surface 44 on the blank 15. The curved cutting edge 42 gives the face and the flank of one side of each tooth an added tolerance or clearance for the teeth as they go in and out of meshing engagement and compensates for flexure of the teeth, producing a quieter operating gear. The radius of curvature of the cylindrical surface is complementary to or identical with the spherical convex opposing surface. By producing mating gears having two surfaces as described, when in mesh with one another the spherical convex involute surface of one gear engages a complementary (i. e. of corresponding radius and direction of curvature) cylindrical concave involute surface on the opposite gear in circular line contact. This circular line contact is maintained in the event the axis of the gears should vary angularly in any direction, as the gears will recenter themselves in response to slight end play of a few thousandths. It is preferred that the female or concaved surfaces be the driving surfaces and the male or convexed surfaces be the driven surfaces of a pair of gears, to put the greater load on the teeth as they are receding.

I claim:

1. A pair of mating gears carrying a pair of teeth engaged at a pair of surfaces, one of said surfaces being concave and curved radially of its gear and the other surface being convex and curved radially of its gear, said surfaces having both transverse circular line contact and curved radial line contact at the positions taken by the gears upon variation of their relative axis angularities in all directions.

2. A pair of mating gears carrying a pair of teeth engaged at a pair of surfaces having circular line contact at the positions taken by the gears upon variation of their relative axis angularities in all directions, one of said surfaces having a cylindrically concaved involute curvature, and the other surface having a spherically convexed involute curvature.

3. A pair of mating gears carrying a pair of teeth engaged at a pair of surfaces having circular line contact at the positions taken by the gears upon variation of their relative axis angularities in all directions, one of said surfaces having a cylindrically concaved axial curvature and a generated involute radial curvature, and the other surface having a spherically convexed axial curvature and a generated spherical involute radial curvature.

4. A pair of mating gears carrying a pair of teeth engaged at a pair of surfaces having circular line contact at the positions taken by the gears upon variation of their relative axis angularities in all directions, one of said surfaces having a cylindrically concaved axial curvature and a generated involute radial curvature, and the other surface having a spherically convexed axial curvature and a generated spherical involute radial curvature, said cylindrically concaved and spherically convexed axial curvatures having the same radius of curvature, and said involute and spherical involute curvatures being generated about the pitch line of the teeth.

5. A gear of the character described provided with teeth each having a cylindrical concave involute surface on one side and a spherical convex involute surface on its opposite side, said involute surfaces being generated about the pitch circle of the teeth.

6. A gear of the character described having a tooth surface of cylindrically concaved axial curvature and an involute radial curvature generated about the pitch circle, and an opposing tooth surface of spherically convexed curvature and a generated spherical involute radial curvature, said involute curvatures being generated about the pitch circle of the tooth, and said cylindrically concaved and spherically convexed curvatures having the same radius of curvature.

CHARLES O. WINGREN.

REFERENCES CITED

The following references are of record in the file of this patent:

UNITED STATES PATENTS

| Number | Name | Date |
|---|---|---|
| 1,355,919 | Schurr | Oct. 19, 1920 |
| 2,065,021 | Pioch et al. | Dec. 22, 1936 |
| 2,248,158 | Boor | July 8, 1941 |